G. GRIEST.
BRAKE FOR CARRIAGES.
No. 6,489.                    Patented June 5, 1849.
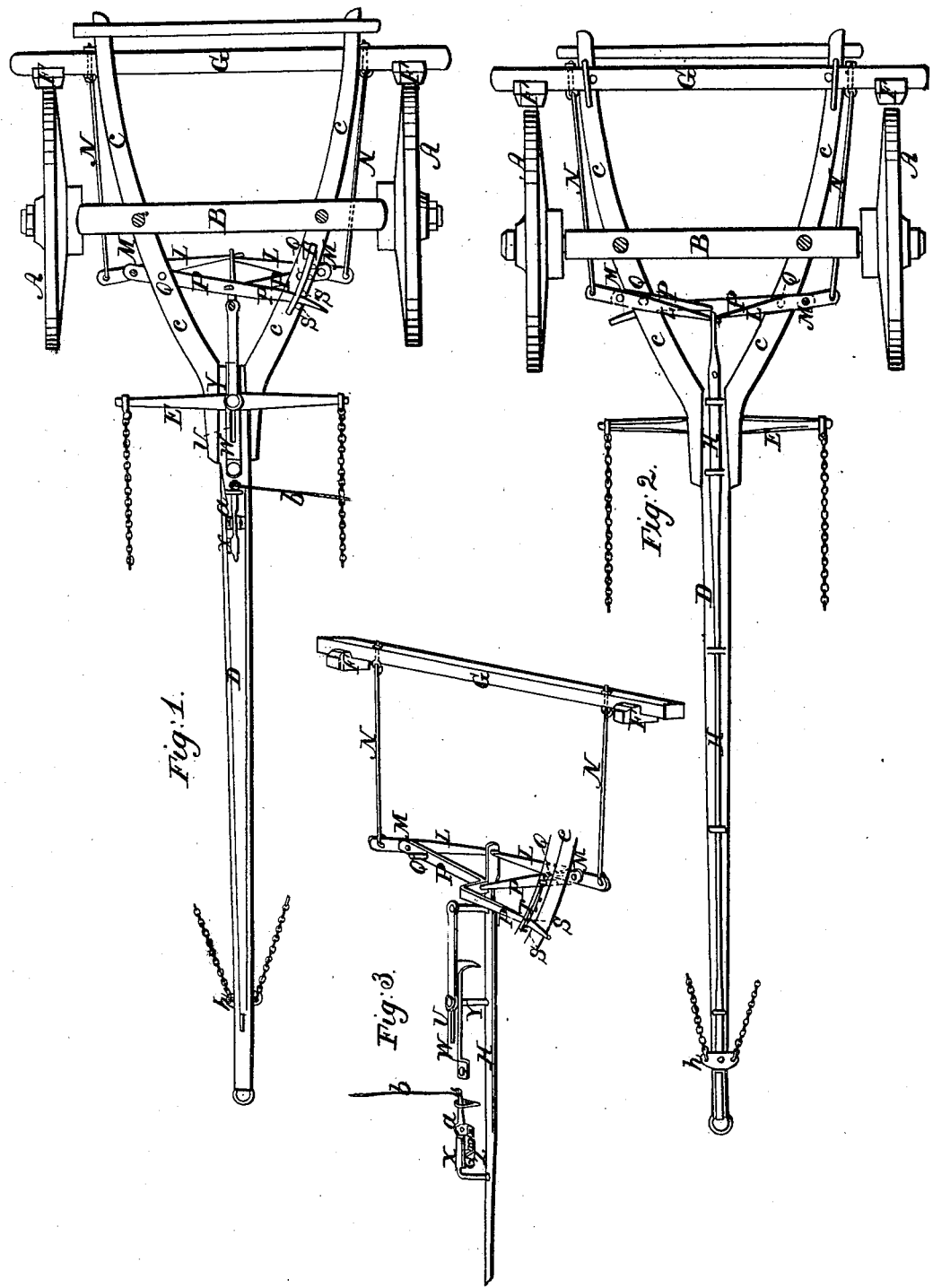

UNITED STATES PATENT OFFICE.

GIDEON GRIEST, OF ADAMS COUNTY, PENNSYLVANIA.

BRAKE FOR CARRIAGES.

Specification of Letters Patent No. 6,489, dated June 5, 1849.

*To all whom it may concern:*

Be it known that I, GIDEON GRIEST, of the county of Adams and State of Pennsylvania, have invented a new and useful Improvement in the Self-Acting Retarder for Retarding the Motion of Carriages in Descending Hills, called "Griest's Self-Acting Retarder," which is described as follows, reference being had to the annexed drawings of the same, making part of this specification.

Figure 1, is a plan of the forward part of the running gear of a wagon, showing the forward wheels, hounds or futchels, tongue, sway bar, rubbers, sliding bar, levers, and connecting rods, the rubbers being represented in contact with the peripheries of the wheels. Fig. 2 is a plan of ditto inverted, the rubbers being represented a distance from the wheels. Fig. 3 is a perspective view of the retarding apparatus detached from the running gear of the carriage. Fig. 4 is a section of the tongue showing the oblong mortise in the same in which the bolt of the sway bar plays.

Similar letters in the several figures refer to corresponding parts.

A A are two forward wheels of a wagon. B is the axle-tree. C C are the hounds or futchels. D is the tongue. E is the sway bar. F F are the rubbers. G is the bar to which the rubbers are affixed. H is a sliding rod to which the breast chains are attached. These parts are made and arranged in the usual manner.

The improvement relates to a combination of levers and rods connected with the hounds or futchels, sliding rubber bar, and sliding rod, and stops for the purpose of changing the position of the fulcra of the levers attached to the rubber bar as the rubbers wear, in order to keep the rubbers at a uniform distance from the peripheries of the wheels. Also in attaching the sway bar bolt to the sliding rod and making an oblong opening or slot of sufficient length in the ordinary tongue to allow it to play back and forth simultaneously with the forward and back movements of the rubbers for preventing the sway bar striking the horses during the operation of the retarding apparatus and the sudden advance of the carriage or wagon. And also for throwing back the rubbers from the wheels by the forward movement of the horses, drawing forward the sway bar and the sliding rod attached thereto, causing the motion of the levers to be reversed. Likewise in attaching to the tongue an apparatus for locking the sliding rod to it so as to prevent the action of the retarding apparatus at pleasure.

L L are two levers for actuating the rubbers, whose fulcra M, M, which are attached to other levers are adjustive and whose longer arms are connected to the sliding rod H by passing their extremities through an eye in the same, or otherwise connecting them together, and whose short arms are attached to the sliding rubber bar G by means of two connecting rods N, N.

P P are two adjustive levers for adjusting the fulcra M M of the levers L L farther from the axis of the wheels so as to bring the rubbers nearer to the peripheries of the wheels in order to compensate for the gradual wear or reduction in size of the rubbers. Q Q are the fulcra of said levers P P, fixed in the hounds or futchels c c, or other convenient part of the carriage. The fulcra M, M, of the levers L L are fixed in these levers P P. The distance from the stationary fulcra Q to the movable fulcra M of both sets of levers is the same. The long arms of the levers P P are connected together so that by moving one of them the other will move a like distance causing the fulcra M M to move simultaneously in the arcs of circles an equal number of degrees toward or from the axis of the wheels. One of the levers P is extended beyond the point of connection and beyond one of the hounds, or futchels, into which stops are inserted for holding it in any required position according to the desired position of the fulcra M, M, and rubbers F, F. If it be desired to bring the rubbers nearer to the wheels the levers P must be moved toward the axle-tree. And in an opposite direction if the rubbers be required to be moved from the wheels in either case the lever is held in its required position by the stops S, S, which are changed to the several holes in the hounds or futchels. The staple T is for the purpose of keeping the lever from rising above the stops. This method of adjusting the position of the rubbers by changing the position of the fulcra of the levers to which the rubber bar is attached is a very important feature in the construction of the retarder in order to compensate for the constant wear of the rubbers and by which the frequent shoeing or changing of the rubbers is rendered unnecessary. This feature I believe is not found in any of the self acting locks and therefore I shall make it my principal claim.

The sway bar E is permitted to move back from the horses as the retarding apparatus moves toward them in descending hills and again to advance or move forward in order to throw back the rubbers from the wheels by making a long mortise U in the tongue (which has no longitudinal movement between the hounds or futchels) and placing the sway bar bolt V which is inserted into the sliding rod, in said mortise. The strain is removed from this bolt in drawing the wagon forward or backing it, by causing the bolt V to come in contact with the tongue at the ends of the mortise, or against a slotted iron plate W, bolted to the tongue to protect the tongue from wear and to strengthen it. This bolt V, with the sway bar E, and sliding rod H, connected together move simultaneously, while the tongue does not move from its required position; and when these parts move back the rubbers move forward against the wheels and when they move forward the rubbers move back.

X is a dog or lever for connecting the sliding rod H to the tongue so as to stop the action of the retarder. This dog is in the form of a right angled lever, the horizontal portion of which lying parallel with the tongue, above the same, and turned up at one end in the form of an eye and the vertical portion passing through the tongue being prevented from touching the sliding rod (when the retarder is in action) by a spring Z, placed between the tongue and dog which raises it from the tongue.

*a* is the fulcrum of the dog, or lever, fastened to the tongue.

*b* is a strap, cord, or chain leading from the dog to within reach of the driver, who, when he desires to stop the action of the retarder for backing, or for any other purpose, draws said cord *b*, which moves the dog and forces the vertical portion of it into an aperture in the sliding rod, and thus locks it to the tongue.

To disengage the dog from the bar the cord must be slackened; the dog will then rise from the rod by the action of the spring. The sliding rod moves longitudinally back and forth in staples inserted into the under side of the tongue. The breast chains are attached to a small transverse perforated plate *h* fastened to the sliding rod.

In descending hills or inclined planes the retarding apparatus is put in action by the descent of the vehicle to which it is attached and the holding back of the sliding rod H to which the breast chains of the horse are attached causing the levers L L to vibrate and the sliding bars G with the rubbers F, F, to advance against the wheels and the sway bar to move back with the rod. When the vehicle is passing over a level; or is ascending an inclined plane, the sway bar to which the horses are attached will be drawn forward, and with it the sliding rod attached thereto, which will vibrate the levers connected with it and move back the rubbers from the wheels.

The manner of changing the position of the fulcra of the levers L, so as to bring the concave surface of the rubbers F at a uniform distance from the peripheries of the wheels to compensate for the wear of the rubbers having been described need not be repeated.

What I claim as my invention and desire to secure by Letters Patent, is—

The combination of the levers P P with the levers L L rods N, N, bar G, sliding rod H and rubbers F, F, arranged and operated substantially as above described and for the purpose set forth.

In testimony whereof I have hereunto signed my name before two subscribing witnesses.

GIDEON GRIEST.

Witnesses:
JOHN T. FERREE,
W. W. HOLTZINGER.